United States Patent [19]

Foucras et al.

[11] 4,415,447

[45] Nov. 15, 1983

[54] SEPARATORY APPARATUS COMPRISING MEANS FOR ANCHORING A SEMI-PERMEABLE MEMBRANE TO A SUPPORT MEMBER

[75] Inventors: Jacques Foucras, Bron; Georges Rodet, Communay, both of France

[73] Assignee: Rhone-Poulenc Industries, Paris, France

[21] Appl. No.: 301,533

[22] Filed: Sep. 14, 1981

Related U.S. Application Data

[63] Continuation of Ser. No. 105,916, Dec. 21, 1979, abandoned.

[30] Foreign Application Priority Data

Dec. 21, 1978 [FR] France .............................. 78 37029

[51] Int. Cl.³ .............................................. B01D 31/00
[52] U.S. Cl. ............................... 210/321.1; 210/433.2; 210/456; 210/498; 210/541
[58] Field of Search ............... 210/488, 492, 498, 541, 210/321, 433, 455, 456; 55/158; 422/48

[56] References Cited

U.S. PATENT DOCUMENTS

| | | | |
|---|---|---|---|
| 4,113,625 | 9/1978 | Riede | 210/541 X |
| 4,165,082 | 8/1979 | Foucras et al. | 210/321.1 |

FOREIGN PATENT DOCUMENTS

| | | | |
|---|---|---|---|
| 2127155 | 10/1972 | France | 210/321.3 |
| 2305214 | 10/1976 | France | 210/321.3 |
| 2331602 | 6/1977 | France | 210/321.3 |
| 295230 | 3/1971 | U.S.S.R. | 210/321.3 |

Primary Examiner—David R. Sadowski
Attorney, Agent, or Firm—Burns, Doane, Swecker & Mathis

[57] ABSTRACT

Separatory, e.g., ultrafiltration apparatus including a plurality of semi-permeable membranes and a plurality of ridge ribbed support members therefor, is provided with means for anchoring said membranes to and between successive supports.

19 Claims, 8 Drawing Figures

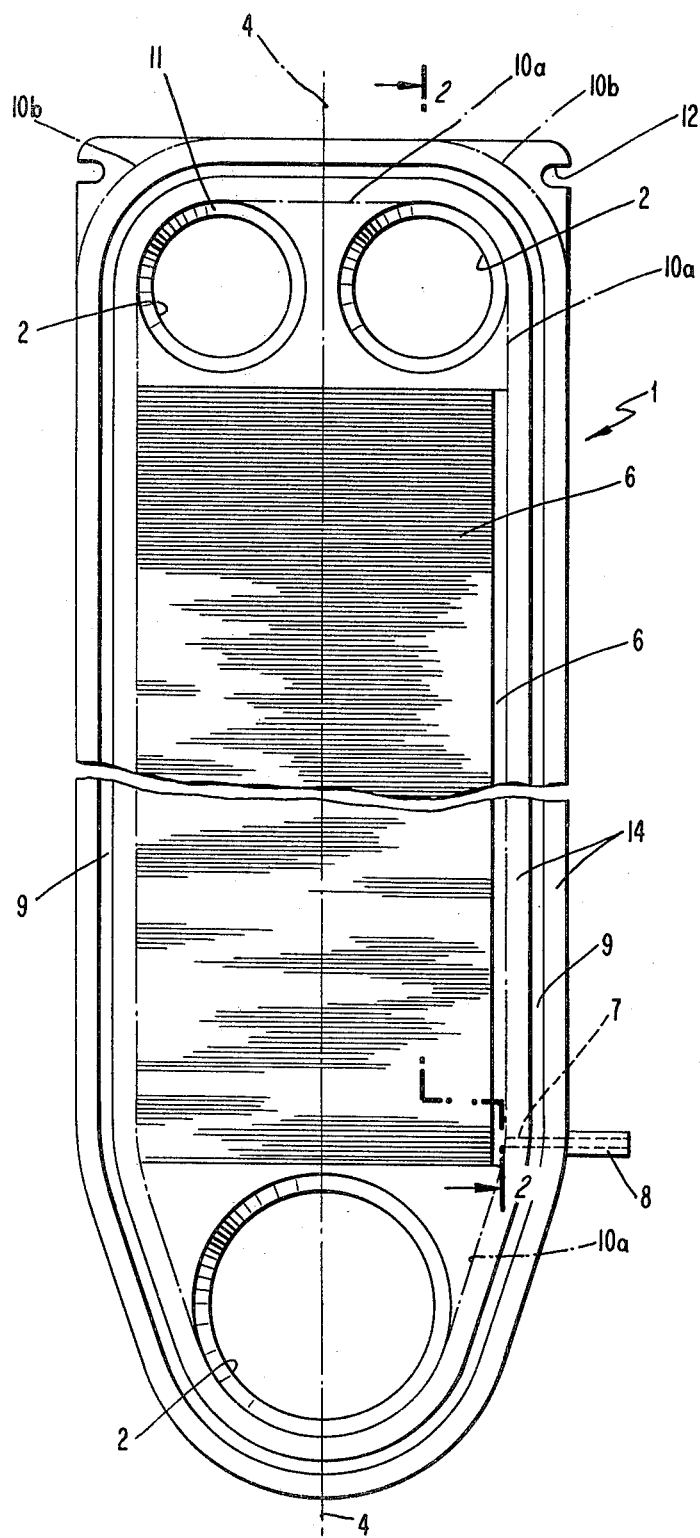
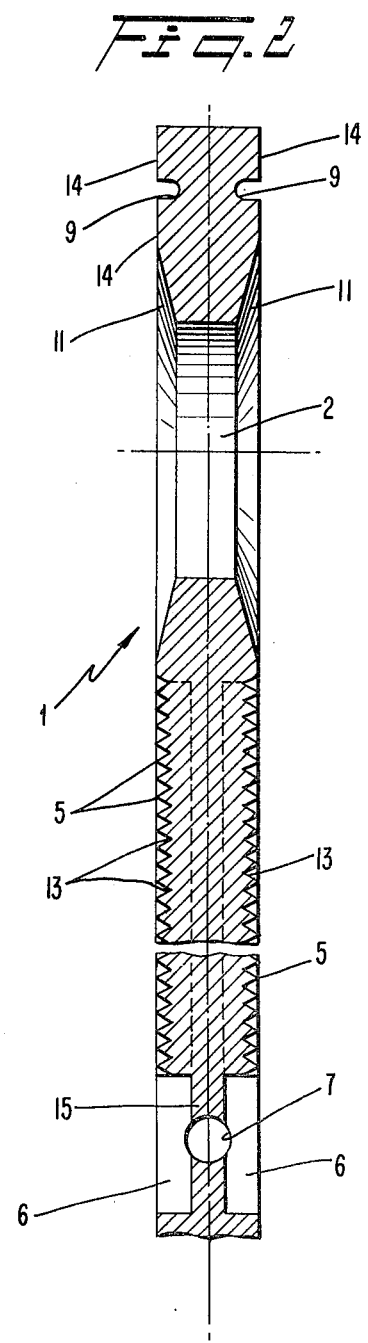
Fig.1

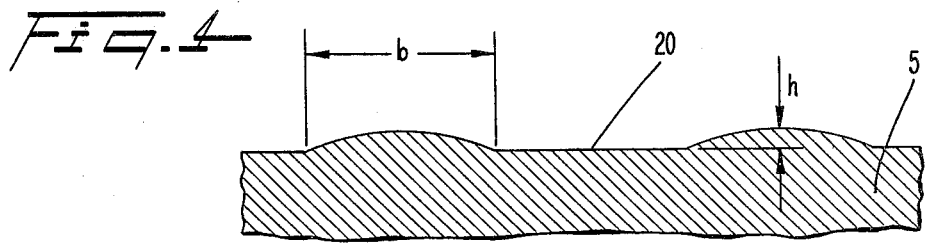
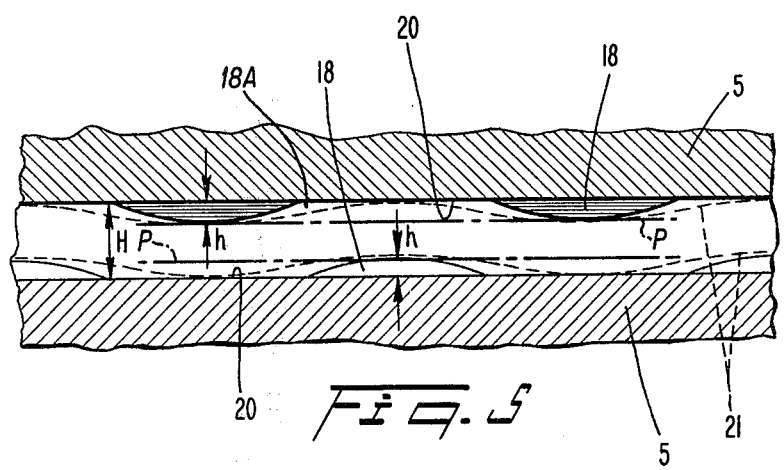
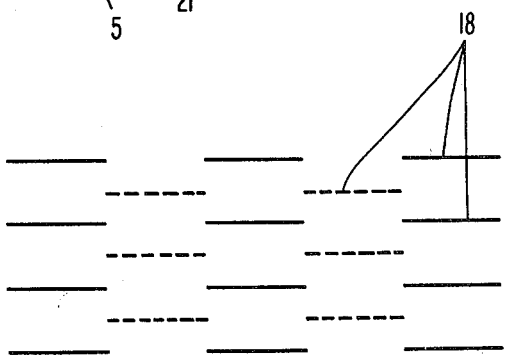
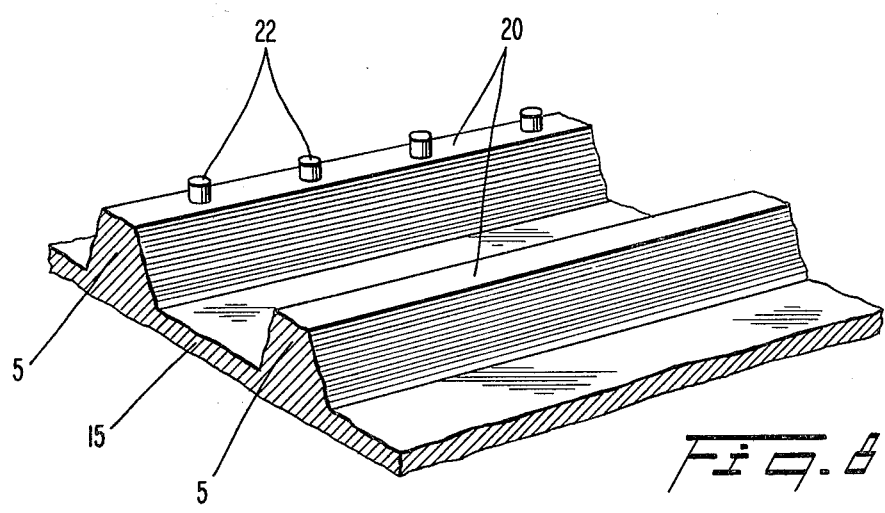

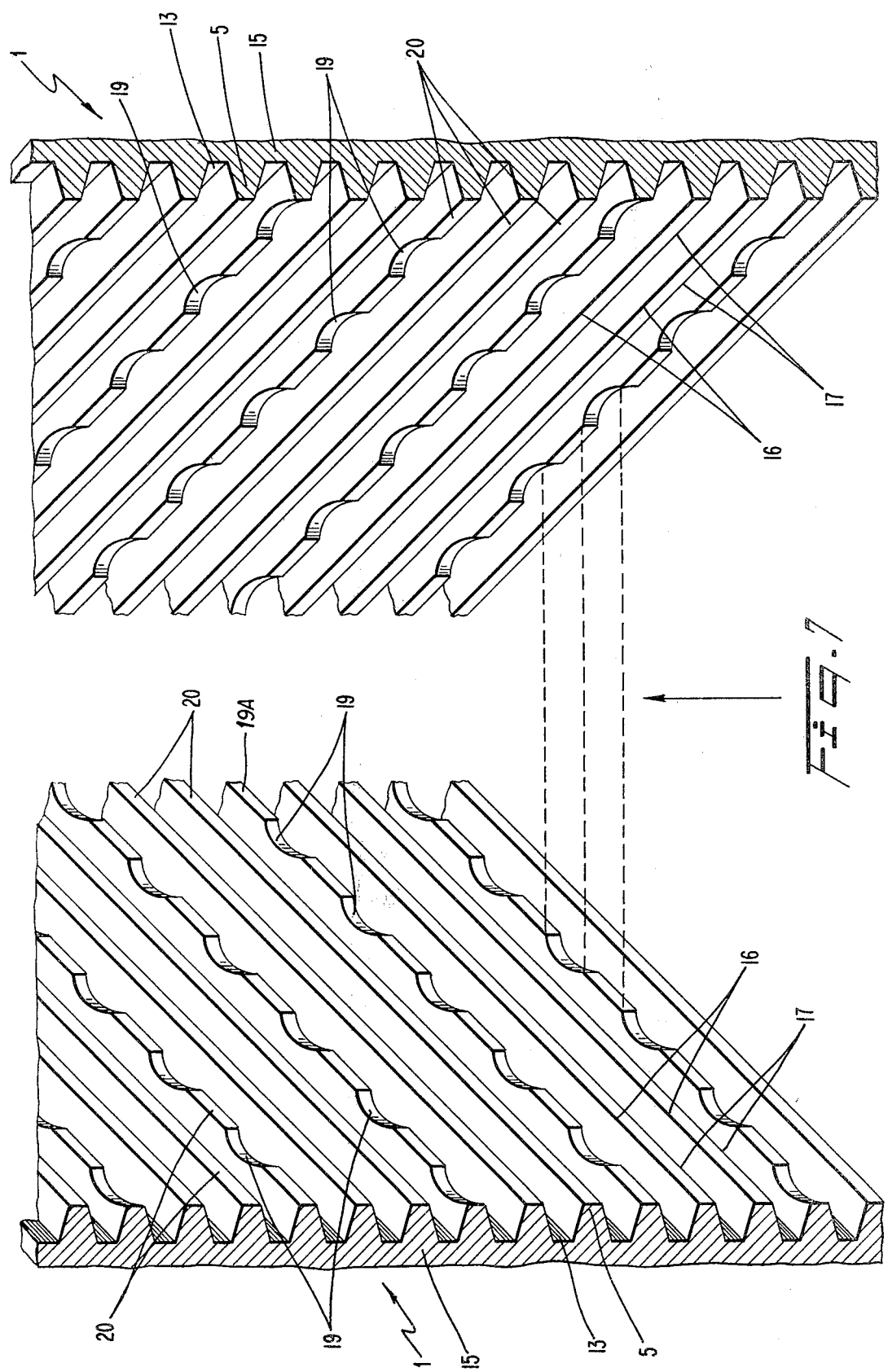

SEPARATORY APPARATUS COMPRISING MEANS FOR ANCHORING A SEMI-PERMEABLE MEMBRANE TO A SUPPORT MEMBER

This application is a continuation of application Ser. No. 105,916, filed Dec. 21, 1979, now abandoned.

BACKGROUND OF THE INVENTION

1. Field of the Invention

The present invention relates to separatory apparatus for separating liquids by selective permeability, e.g., by ultrafiltration, the said apparatus comprising a plurality of specifically designed support plates for semi-permeable membranes.

2. Description of the Prior Art

Separatory apparatuses comprised of a plurality of planar, semi-permeable membranes are well known to this art; compare, for example, French Pat. No. 2,127,155 and its Certificate of Addition No. 2,141,417. These apparatuses comprise sub-units which are formed, in particular, by the juxtaposition of a certain number of memberane support plates, the pressurized fluid to be treated, which is generally liquid, circulating in parallel between the membranes on two successive support plates (of one sub-unit), which support plates are provided with orifices towards each of their ends, for the passage of the said fluid, while this fluid circulates in series from one sub-unit to the next by virtue of the presence of so-called intermediate plates which only have one orifice towards one of their ends. The fluid which has passed through the membranes, and is referred to as the ultrafiltrate, is recovered individually for each support plate, on the edge of the latter. The support plates of such apparatuses comprise a cell on each of their faces and each cell comprises means for supporting a membrane and a woven membrane, is placed in direct contact with the said ribs, and in the case where an apparatus equipped with such support plates is used at temperatures of 80° C. or above.

SUMMARY OF THE INVENTION

Accordingly, a major object of the present invention is, in a separatory apparatus of semi-permeable membrane type, the provision of a support plate which preferably has transverse or essentially transverse ridge ribs, in the direction of flow of the pressurized liquid to be treated, but which plate does not exhibit the wrinkling-/tearing disadvantages of the known plates.

More particularly according to the invention, there is featured novel separatory apparatus especially adapted for ultrafiltration and which comprises a plurality of support plates secured in a leaktight manner and spaced apart from one another at their periphery, each support plate possessing an inlet or outlet orifice at each of its ends, for the passage of the fluid to be treated, and comprising a semi-permeable membrane on each of its face surfaces, which membrane covers and defines a cell comprising ribs which are parallel to one another, the said ribs defining grooves between one another, which grooves enable discharge of the ultrafiltrate into a channel connected to the edge of the support plate on the outside of the said apparatus, characterized in that at least some of the ribs of each cell comprise means for anchoring the membrane, and in that the spacing H between the apices of the ribs of two consecutive support plates is greater than the sum of the heights (h+h) of two anchoring means of two support plates facing each other.

BRIEF DESCRIPTION OF THE DRAWINGS

The mention will be more clearly understood by reference to the annexed drawings, which illustrate, by way of example only, certain preferred embodiments of the support plates/separatory apparatus according to the invention.

FIG. 1 is an elevational front view of a support plate according to the invention;

FIG. 2 is a cross-sectional view taken along the line II—II of FIG. 1;

FIG. 4 is a partial sectional view along a single rib, with protuberances, according to FIG. 3;

FIG. 5 is a partial sectional view taken perpendicular to the longitudinal axis of the plate and along ribs, without protuberances, of two support plates according to FIG. 3, the said plates having been represented only by the ribs 5 of two cells facing each other;

FIG. 6 is a schematic representation of the relative positioning of the anchoring points of two support plates facing each other;

FIG. 7 is a partial perspective view, on a larger scale, showing another embodiment and another method of mutual positioning of two support plates of an apparatus according to the present invention; and FIG. 8 shown another embodiment of the anchoring points on the ribs of support plates of an apparatus according to the invention.

DETAILED DESCRIPTION OF THE INVENTION

Figure 3:
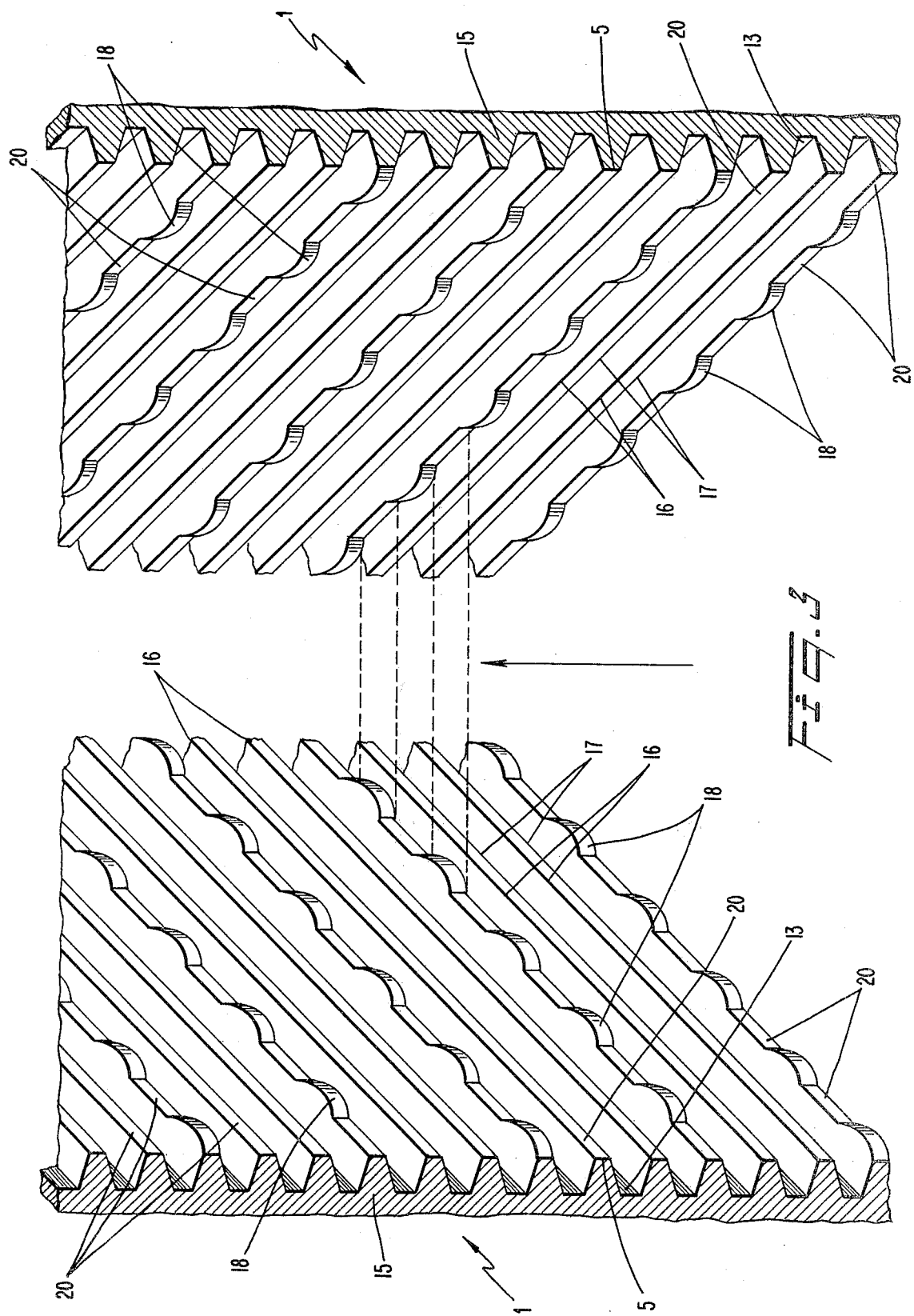
FIG. 3 is a partial perspective view, on a larger scale, showing a preferred embodiment and a preferred method of mutual positioning of two support plates according to the present invention.

One embodiment of a support plate 1 of an apparatus according to the present invention is shown in FIGS. 1, 2 and 3. FIGS. 1 and 2 depict a plate which is known, per se, in particular from U.S. Pat. No. 4,165,082, while FIG. 3 more particularly illustrates an embodiment of the improvement made to each support plate for separatory apparatus according to the present invention. Such a plate 1, which is generally of elongate shape, possesses at least one orifice 2 towards each of its ends, for the passage of the fluid to be treated. In the embodiment of FIG. 1, the plate 1 possesses two orifices 2 at its upper extremity, whereas it possesses only one orifice at its lower extremity. Of course, the support plates 1 of the subject apparatus can have the same number of orifices 2 at each of their ends. Between the orifices 2 in each end of the support plate 1 and on each face of the latter, there is a cell 3 which comprises ribs 5 perpendicular to the longitudinal axis 4 of the support plate 1. These ribs 5 determine grooves 13 between one another. The cells 3 on each face surface of the support plate 1 are separated by a thin wall 15.

In a separatory apparatus comprising support plates 1, each of such plates 1 comprises a membrane (not shown in FIGS. 1, 2 and 3) on each of its faces, each membrane covering and defining a cell 3 and at least partially covering the peripheral edge 14 of the support plate 1. The membranes are held in a leaktight manner in the orifices 2, for example, by means of two rings which are not shown in FIGS. 1, 2 and 3, but which are described in greater detail in U.S. Pat. No. 4,165,082. These rings advantageously press the membranes in a leaktight manner against a peripheral widening 11 provided for each orifice 2.

Two consecutive support plates 1, in one apparatus, are preferably spaced apart from one another by means of a butt joint which ensures peripheral leaktightness between the two plates 1 and also the thickness of the sheet or flow of the fluid to be treated under pressure, which circulates between the membranes on two consecutive support plates 1. The support plates 1 shown in FIGS. 1 and 2 comprise, on the periphery 14 of each of its face surfaces, a peripheral groove 9 which may be discontinuous and in which a corresponding extra thickness of the butt joint separating two support plates is positioned; this ensures better positioning and better resistance of the butt joint to the action of the fluid to be treated, which circulates under pressure between the membranes on two consecutive support plates. A butt joint is not shown in FIG. 1, but the broken lines 10a and 10b show its positioning on the support plate 1, the external contour of a joint thus having essentially the same dimensions as that of the contour of the support plate (line 10b) while its internal contour (line 10a) essentially corresponds to the width of the cell 3 and extends proximate the orifices 2. On a support plate 1, a membrane (not shown) has a contour which approximatley corresponds to that of the groove 9 and openings which correspond to the orifices 2 for the passage of the fluid to be treated. In general, the membranes are cut in such a way that, near the orifices 2, same rest on the peripheral widening 11 provided on each face surface of a support plate 1. The notches 12 provided in the upper part of the support plate 1 correspond to means for holding the said support plates 1, which plates are generally employed in the vertical position in the separatory apparatus, a tube 8 for discharging the ultrafiltrate then being advantageously located towards the lower part of each support plate. Each support plate thus comprises at least one tube 8 which is connected, by means of a passage 7 which is located inside the periphery 14 of the plate (but does not pass through the plate), to a longitudinal channel 6 in communication with the grooves 13 used for recovering the ultrafiltrate.

FIG. 3 shows, in greater detail, a preferred and partial embodiment of the ribs 5 of two support plates 1 facing each other, the latter being shown in perspective and in a partial representation. This FIG. 3 further shows a method of relative positioning of two consecutive plates 1, of which only part of their respective cells has been illustrated in order to simplify the representation, the arrow at the center of the figure schematically representing the direction of flow of the fluid to be treated under pressure, which circulates between the two membranes (not shown) of the plates 1 facing each other. Of course, this direction of flow of the fluid to be treated can be opposite to that indicated by the arrow. This FIG. 3 corresponds to a section taken through a plane which is parallel to the longitudinal axis 4 of the plates 1 and perpendicular to those face surfaces of the plates which comprise the cells 3. In FIG. 3, the ribs 5 have been depicted in isosceles trapezoidal cross-section for the sake of convenient representation, but in practice the edges (16 and 17) of the ribs 5 are advantageously rounded in order to prevent the membrane, which rests directly on the top of these ribs 5, from being damaged by unduly sharp edges.

Each support plate 1 shown in FIG. 3 comprises protuberances 18 on some of its ribs 5 over the entire width of the partially shown cell 3, thereby forming an irregular profile comprising alternating portions 18, 18A which are raised and recessed relative to one another. These protuberances 18 serve as anchoring points for the membrane which covers a cell, and are uniformly distributed on the ribs 5. These protuberances 18, which form extra thicknesses on the apices 20 of the ribs 5, advantageously have the shape of an arc of a circle or the shape of a catenary curve and have a b/h ratio of between 5 and 50, and preferably between 10 and 40, b being the dimension of the base of the ridge and h being the dimension of its height, as shown in FIG. 4 which is a partial longitudinal section of a rib 5. The protuberances 18 generally have a height h of between 0.1 and 0.5 mm and preferably between 0.2 and 0.4 mm, while the pitch of two consecutive ribs (either with protuberances or without protuberances) of a cell is generally between 0.5 and 4 mm, and preferably between 1 and 3 mm. The apices 20 of the ribs 5 of a cell 3 are generally in the same plane as the periphery 14 of a support plate 1.

In general, the protuberances 18 are distributed on the ribs 5 in such a way that a membrane which is placed on the periphery 14 of a plate and on the protuberances 18 of the ribs 5 of a cell, when the membrane is being mounted on the support plate, at least partially rests on the apex 20 of each rib between two successive protuberances 18 of a rib, after the apparatus has been subjected to pressure and heat. These protuberances thus act as anchoring points for the membrane, while at the same time favoring the ultrafiltration efficiency to some extent, by increasing the ultrafiltration rate by about 15 to 20%.

However, it must be pointed out that, in an apparatus according to the present invention, the thickness $H_M$ of the sheet or flow of fluid to be treated under pressure, between the membranes 21 on two successive support plates, is greater than the sum of the heights h of two protuberances 18 which are (or are not) facing one another. Therefore, the raised portions 18 of each plate 1 terminate short of an imaginary plane P formed by the raised portions of its opposing plate 1. Thus, referring more precisely to FIG. 5, it is seen that, in an apparatus according to the present invention, two successive plates have ribs 5, the apices 20 of which are held apart from one another in every plane parallel to their opposite faces, the distance H between the apices 20 of the opposite ribs essentially corresponding to the thickness of the sheet or flow of fluid circulating between the membranes 21 on two consecutive support plates.

In the partially shown apparatus according to FIG. 3, the support plates 1 have ribs 5 with protuberances on every third rib 5, in each cell, and the protuberances are staggered from one rib 5 with protuberances to the next, in one and the same cell. Furthermore, the ribs 5 with protuberances 18 face one another from one plate 1 to the next, opposing protuberances 18 being staggered relative to one another. However, with the same configuration of protuberances 18, every successive rib 5 can have protuberances. More generally, the pitch of the ribs 5 with protuberances 18, namely, the distance between two successive ribs 5 with protuberances, in one and the same cell, can be between 1 and 75 mm. In general, the number of anchoring points or protuberances 18 on a rib 5 is 2 to 20 per 100 mm length of the rib in question.

It is also possible, in an apparatus according to the present invention, for each support plate to comprise, in each cell, ribs 5 of which the protuberances 18 are not staggered between two successive ribs 5 bearing protuberances. In this case, a rib, with protuberances, of a support plate is advantageously opposite a rib, without protuberances, of the adjacent plate, the protuberances of each plate being laterally staggered relative to one another. This method of relative positioning of the ribs, with protuberances, of two consecutive support plates is represented schematically in FIG. 6, the protuberances on a rib being shown in solid lines for one support plate and in dotted lines for the ribs of the support plate facing it, and the ribs, without protuberances, of each support plate not being shown.

An apparatus equipped with 6 sub-units, each comprising 24 support plates 1 such as those described above and shown in FIGS. 1 to 5, has been produced, in particular, with support plates having the following dimensions:

| | |
|---|---|
| Thickness of a support plate: | 5.5 mm |
| Distance between orifices 2 from one end of the support plate to the other: | 770 mm |
| Width of each cell 3: | 125 mm |
| Pitch of the ribs 5 in a cell perpendicular to the longitudinal axis 4 of each support plate: | 1.5 mm |
| Height of the ribs 5: | 1.2 mm |
| Width of the base of the ribs 5: | 0.9 mm |
| Width of the apex 20 of the ribs 5: | 0.6 mm |
| Pitch of the ribs 5 with protuberances 18: | 4.5 mm |
| Height h of each protuberance 18: | 0.3 mm |
| Length of the base of the protuberances 18 on the apex 20 of a rib: | 4 mm |
| Pitch of the ridges 18 on a rib: | 8 mm |
| Thickness $H_M$ of the sheet or flow of fluid to be treated, between the membranes 21 resting on the apices 20 of the ribs 5 of two plates facing one another. | 1.4 mm |

With this apparatus, there was no wrinkle formation or tearing of the membranes after stopping and restarting the apparatus 20 times, under a relative pressure of 4 bars using a temperature cycle of from 15 to 80 degrees.

With an identical apparatus which did not, however, comprise any protuberances on the ribs, the membrane tore after stopping and restarting the apparatus but twice, under the same pressure and temperature conditions.

In both cases, the membrane used was a woven membrane patented by the Societe Rhone-Poulenc Industries under French Pat. No. 2,331,602. More precisely, the membrane used was obtained from a mixture of 80% by weight of a polysulfone containing a plurality of units of the formula:

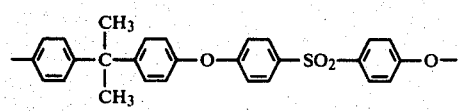

(and sold by the Societe Union Carbide under the tradename, P 1 700) and 20% by weight of the same polymer after sulfonation, in the form of its sodium salt, this sulfonated polymer having an exchange capacity of 950 meq/kg.

The weft of this membrane had a thickness of 120 microns, a mesh size of 75 microns and a tensile strength of 55 kg for a 50 mm × 100 mm test piece. This woven membrane was asymmetric and had a total thickness of 200 microns and a permeability to water of 20,000 liters/day.m² (liters per day per square meter) under a relative pressure of 2 bars. The cut-off threshold of this membrane to proteins was 20,000.

With this apparatus, it was also possible to increase the ultrafiltration rate by about 15 to 20%, relative to the same apparatus equipped with support plates of which the ribs did not have any protuberances. This difference in the ultrafiltration rate was demonstrated by carrying out the ultrafiltration, at 25° C., under a relative pressure of 2 bars and at a tangential speed, at the level of the membranes, of 2.5 meters/second, of an emulsion of cutting oil, having the following composition by weight:

| | |
|---|---|
| Oil, reference 100 NEUTRAL, sold by the CFR (Compagnie Francaise de Raffinage): | 4% |
| Emulsifier, trademark ADOGIL 58, manufactured by OROGIL: | 1% |
| Water: | 95% |

Although the apparatus described above has been shown with support plates 1 having ribs 5 which are perpendicular to their longitudinal axis 4, which corresponds to a preferred embodiment, the apparatus according to the invention can, however, have support plates with ribs which are not perpendicular to their longitudinal axis 4. For example, such ribs 5 can form an angle of between 40° and 90° with the longitudinal axis 4 of a support plate 1.

The protuberances 18 of the ribs 5 of a support plate 1 can be produced, for example, by electro-erosion in the corresponding grooves in the mold of the plate which is advantageously to be injection-molded under pressure. These protuberances 18 can also be produced when the grooves in the molds are being cut with a milling tool, by forcing the latter down a little further at the points where it is desired to have protuberances 18 on the rib of a support plate 1.

Numerous variants of an apparatus according to the present invention are well within the skill in the art. By way of non-limiting examples, FIGS. 7 and 8 show two embodiments of such variants.

FIG. 7 is a partial view in perspective of two support plates facing one another, as in FIG. 3, but, in this embodiment, the support plates 1 each comprise cells of which some of the ribs 5 have membrane anchoring points consisting of notches 19, thereby forming an irregular profile comprising alternating portions 19A, 19 which are raised and recessed relative to one another. These notches 19 and the ribs 5 of the support plates according to FIG. 7 can have all the characteristics of the protuberances and the ribs 5 of the support plates according to the FIG. 3, the only difference being that the anchoring points consisting of the notches 17 do not form extra thicknesses on the ribs 5. These notches 19 thus correspond to the removal of material from the ribs 5 and preferably have the same shape as the protuberances 18 considered above. All the variants mentioned for the support plates with protuberances 18 can thus apply to the support plates of which the ribs 5 have notches 19, especially as regards the distribution of these notches 19 on a rib 5, the pitch of the ribs 5 with notches, the staggering of the notches, the angle formed by the ribs 5 with the longitudinal axis 4 of a support plate 1, and the relationship whereby the raised portions 19A terminate short of an imaginary plane formed by the raised portions of an opposing plate 1. In particular in the apparatus according to FIG. 7, on each cell of each support plate 1, a membrane rests on the apex 20 of each rib, between two successive notches 19 on a rib 5, and curves inwards, at least partially, into each notch 19 after the apparatus has been subjected to pressure and heat. These notches 19 thus act as anchoring points for the membrane. The notches 19 can be produced, for example, by milling an injection-molded plate or by milling the molds used for the injection-molding of the support plates. In the latter case, the milling tool used to cut the grooves in the mold is forced down into the grooves a little less at the points where notches are to appear on the ribs of the support plates.

FIG. 8 shows another embodiment of membrane anchoring points on the ribs 5 of each cell of a support plate. These anchoring points consist of spikes 22 which are advantageously in the form of small truncated pyramids with a circular base, of which the width of the base b essentially corresponds to the width of the apex 20 of each rib, and of which the height h is such that the ratio b/h is between 1 and 10, and preferably between 2 and 5. All the variants mentioned for the ribs with protuberances 18 can apply to support plates having ribs with spikes 22, especially as regards the distribution of these spikes 22 on a rib 5, the pitch of the ribs with spikes 22, the staggering of the spikes, and the angle formed by the ribs 5 with the longitudinal axis 4 of each support plate 1. In particular, with an apparatus equipped with support plates 1 having ribs 5 with spikes 22, for each cell, a membrane rests, at least partially, on the apex 20 of each rib 5, between two successive spikes 22 on a rib 5, and the thickness $H_M$ of the sheet of fluid to be treated under pressure, between the membranes of two successive support plates 1, is greater than the sum of the heights h of two spikes 22. These spikes 22 are produced, for example, by milling the molds in which the plates are injection-molded.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. Separatory apparatus especially adapted for ultrafiltration comprising a plurality of support plates of generally elongate shape and each defining a longitudinal axis, said plates secured together in a leaktight manner and spaced apart from one another at their peripheries, each support plate including two oppositely disposed faces in which are formed a plurality of longitudinally spaced fluid conducting orifices for conducting fluid to be treated, each of said faces defining a cell, a semi-permeable membrane covering each cell, said plates being arranged such that a membrane covering the cell of one of said plates faces a membrane covering a cell of an adjacent plate and is spaced therefrom to define a fluid passage therebetween which passage communicates with said orifices to conduct fluid to be treated, each support plate including parallel ribs disposed in the respective cell and extending in a direction transverse relative to said longitudinal axis, each rib defining opposite ends and an outer edge extending in said transverse direction from one of said ends to the other said end, said ribs being spaced apart along said longitudinal axis to define grooves therebetween, a discharge channel disposed adjacent a peripheral edge of each said cell and communicating with said grooves of its associated cell to receive ultrafiltrate from such grooves, said outer edges of at least some of said ribs of each cell being of irregular profile and forming alternating portions which are raised and recessed relative to one another along the respective rib outer edge so as to contact the associated membrane and define membrane anchoring means therefor, said raised portions each defining an outermost section, a plurality of said outermost sections of a respective cell defining an imaginary plane extending parallel to the respective cell, said outermost sections of each of said mutually facing cells terminating short of the imaginary plane of the other of said mutually facing cells.

2. The separatory apparatus according to claim 1, wherein said raised portions comprise protuberances which extend beyond the outer edges of an adjacent rib of the same plate.

3. The separatory apparatus according to claim 2, wherein said raised portions of one plate are in face to face alignment with complementary recessed portions in the ribs of an opposing plate.

4. The separatory apparatus according to claim 2, wherein each said membrane is secured to the rib outer edges and to said protuberances.

5. The separatory apparatus according to claim 2, wherein each said protuberance circumscribes the arc of a circle, the ratio b/h being from 5 to 50, with b being the length of the base of each said curve and h being the height thereof.

6. The separatory apparatus according to claim 5, wherein the ratio b/h is from 10 to 40.

7. The separatory apparatus according to claim 2, wherein each said protuberance circumscribes a catenary circle, the ratio b/h being from 5 to 50, with b being the length of the base of each said curve and h being the height thereof.

8. The separatory apparatus according to claim 7, wherein the ratio b/h is from 10 to 40.

9. The separatory apparatus according to claim 2, wherein said protuberances comprise truncated pyramids.

10. The separatory apparatus according to claim 9, wherein the length of the base b of each truncated pyramid is substantially equal to the width of the rib from which said pyramid extends, the ratio b/y being from 1 to 10, with h being the height of said pyramid.

11. The separatory apparatus according to claim 10, wherein the ratio b/h is from 2 to 5.

12. The separatory apparatus according to claim 2, wherein there are 2 to 20 protuberances per each 100 mm of rib.

13. The separatory apparatus according to claim 2, wherein the pitch of consecutive ribs is between 1 and 4 mm, and the pitch of successive ribs carrying protuberances being between 0.5 and 75 mm.

14. The separatory apparatus according to claim 1, wherein said ribs form an angle of from 40° to 90° with said longitudinal axis.

15. The separatory apparatus according to claim 1, wherein said ribs form an angle of 90° with said longitudinal axis.

16. The separatory apparatus according to claim 1, wherein said membranes comprise a woven structure.

17. The separatory apparatus according to claim 1, wherein said recessed portions are recessed relative to the apices of an adjacent rib of the same plate.

18. The separatory apparatus according to claim 1, wherein the ribs of one plate are in face-to-face alignment with the complementary cells of an opposing plate.

19. The separatory apparatus according to claim 1, wherein the spacing H between the recessed portions of the mutually facing cells is greater than the sum of the heights (h+h) of the membrane anchoring means of said mutually facing cells, with the dimensions H and h being measured in a plane perpendicular to the longitudinal axis of said plates.

* * * * *